Nov. 24, 1959 O. E. DE LANGE 2,914,671

MICROWAVE SWITCHING CIRCUITS

Filed Oct. 31, 1956 3 Sheets-Sheet 1

INVENTOR
O. E. DE LANGE
BY Alan C. Rose
ATTORNEY

Nov. 24, 1959 O. E. DE LANGE 2,914,671

MICROWAVE SWITCHING CIRCUITS

Filed Oct. 31, 1956 3 Sheets-Sheet 2

INVENTOR
O. E. DE LANGE
BY Alan C. Rose
ATTORNEY

Nov. 24, 1959 O. E. DE LANGE 2,914,671

MICROWAVE SWITCHING CIRCUITS

Filed Oct. 31, 1956 3 Sheets-Sheet 3

INVENTOR
O. E. DE LANGE
BY Alan C. Rose
ATTORNEY 2,914,671

United States Patent Office

Patented Nov. 24, 1959

2,914,671

MICROWAVE SWITCHING CIRCUITS

Owen E. De Lange, Rumson, N.J., assignor to Bell Telephone Laboratories, Incorporated, New York, N.Y., a corporation of New York Application October 31, 1956, Serial No. 619,433

17 Claims. (Cl. 250—27)

The present invention relates to data processing circuits and more specifically to microwave switching and information storage circuitry. In W. M. Goodall, application Serial No. 619,435, entitled "Microwave Data Processing Circuits" and filed on October 31, 1956, a computer or a data processing technology is disclosed in which microwave pulses are employed. The data processing circuits are serial binary circuits, and have pulse repetition rates of up to 50,000,000 to 100,000,000 pulses per second.

In computer and data processing systems, it is desirable to have switching circuits available which may be set to either of two states, and which remain in a given state until reset to another state. In one sense, such circuits are simple binary storage circuits. Bistable multivibrators and lock-up circuits are two well known examples of this type of circuit.

A principal object of the present invention is to provide storage and switching circuits of the type described above for microwave computer systems.

In accordance with the invention, a source of microwave energy is coupled to a wave guide junction which switches the microwave energy from one output to another in accordance with the bias on a control diode in one of the branch wave guides. A detector in one of the two output wave guides is connected to bias the control diode in the sense required to route the microwave energy to the detector. Suitable circuits are also provided to energize the lock-up circuit by applying control signals to the detector or directly to the control diode, and to reset the lock-up circuit by blocking the microwave energy from the detector.

It is a feature of the invention that a microwave lock-up circuit may be realized by the application of control signals from two different sources to the control diode of a microwave switching circuit.

In accordance with another aspect of the invention, a single-pole, double-throw type switch for microwave purposes may be instrumented by the application of microwave signals to two microwave switching circuits including control diodes. The control diodes in the two circuits are interconnected and are energized by a common source or sources.

Other objects, features and advantages of the invention may be readily apprehended from a consideration of the detailed description and from the drawings, in which.

Figure 1:
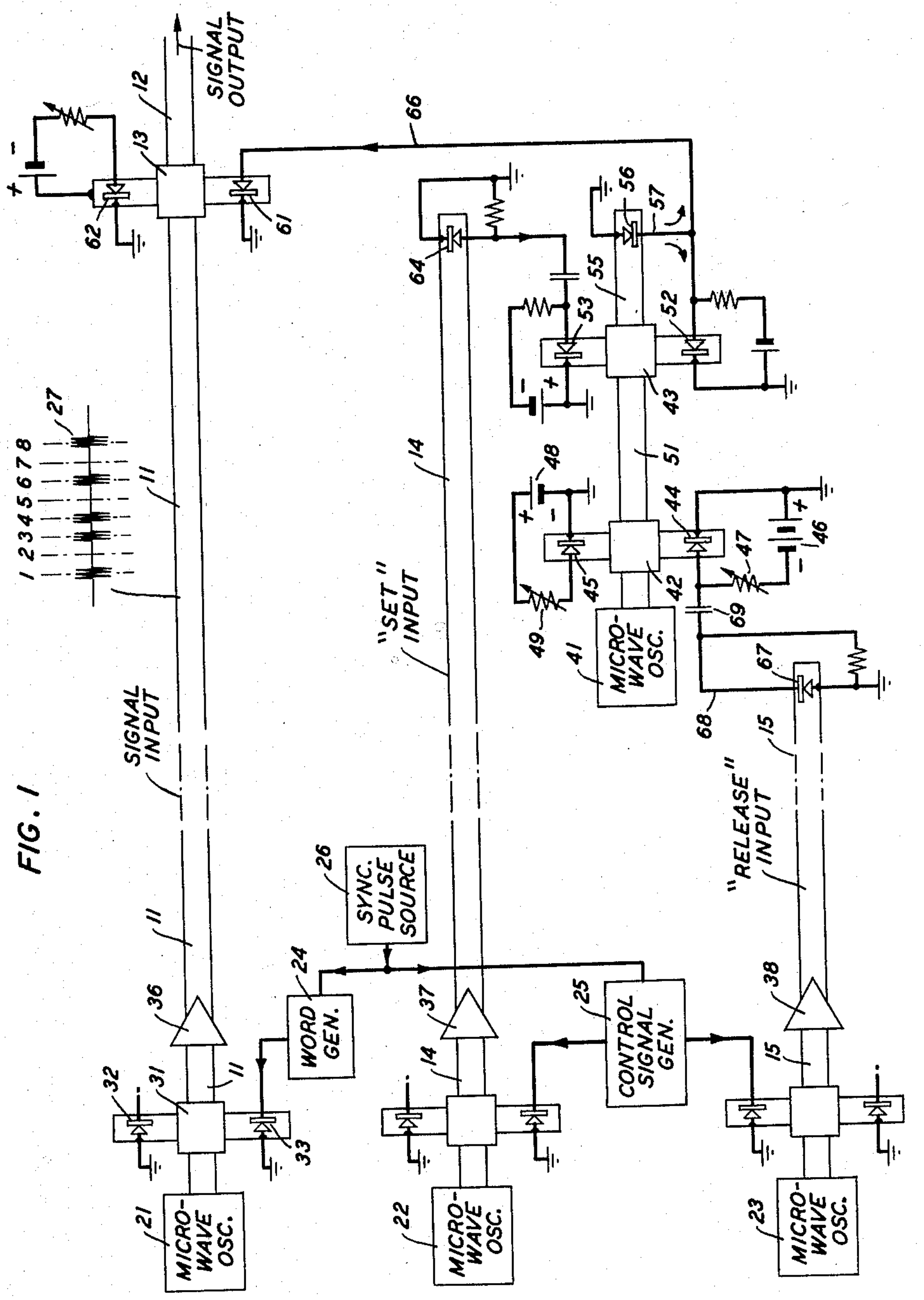
Fig. 1 is a microwave lock-up circuit utilizing hybrid junctions in accordance with one specific embodiment of this invention.

With reference to the drawings, Fig. 1 shows, by way of example, a lock-up circuit and the associated pulse generation circuitry. From an over-all standpoint, the circuit of Fig. 1 is designed to control the transmission of signals from wave guide 11 to the output wave guide 12. Under normal conditions, no signal is transmitted through the hybrid 13 from wave guide 11 to wave guide 12. Following an application of a microwave pulse to the "set" pulse input wave guide 14, however, the hybrid 13 passes signals from wave guide 11 to the output wave guide 12. This situation continues until a microwave release pulse is applied on wave guide 15. This restores the switching circuit to its original state, and the hybrid 13 blocks signals applied to it on wave guide 11.

Turning to a consideration of the detailed circuitry required to accomplish the functions described above, the pulse generation circuits will be reviewed first. The pulse generation circuitry includes the microwave oscillators 21, 22, and 23, the word generator 24, the control signal generator 25, and the synchronizing pulse source 26. The microwave oscillators 21, 22, and 23 may, for example, be klystron oscillators, and may have output frequencies of approximately five kilomegacycles. The pulse trains produced by the pulse generation circuits of Fig. 1 have a relatively high pulse repetition rate. For example, the repetition rate of the digits represented by the modulated pulses shown at 27 as associated with wave guide 11 may range from 50,000,000 to 100,000,000 digits per second.

In serial binary computing apparatus, numbers are characteristically represented by a series of pulses. In general, a series of time slots is established, and binary signals are represented by the presence or absence of pulses in successive time slots. The presence of a pulse in a particular time slot or digit period may correspond to the binary symbol "1", and the absence of a pulse may correspond to the binary symbol "0." The pulses representing a single number or code group appear in a group appear in a group of consecutive digit periods which is normally designated a "word period."

Referring to Fig. 1, it has been noted that the modulated pulse pattern 27 is present in wave guide 11. The pulse pattern 27 represents an eight-digit "word" corresponding to the binary number 10110101. The correspondence between the pulse pattern 27 and the binary number indicated above may be noted from the presence in the pulse train 27 of pulses in digit periods 1, 3, 4, 6, and 8.

The synchronizing pulse source 26 applies pulses to the control signal generator 25 concurrently with the application of pulses to the word generator 24. The word generator 24 may, for example, include a tapped delay line through which the synchronizing pulses are transmitted. Diode switching circuits connected to taps along the delay line may have their outputs connected in parallel. In accordance with the enabling or disabling of the successive switching circuits connected to the taps of the delay lines, pulses appear in successive digit periods. The direct current pulses from the word generator 24 are impressed on microwave signals from the oscillator 21 in the hybrid junction 31. The hybrid junction 31 may, for example, be a "magic T" wave guide structure, such as that shown in Fig. 12.4–7 on page 643 of a text entitled "Principles and Applications of Wave Guide Transmission" by George C. Southworth, D. Van Nostrand Co., Inc., New York, 1950. The hybrid junction may also take the form described in an article entitled "Directional Couplers" by W. W. Mumford, Proceedings of the I.R.E., February 1947, at page 160. Other known hybrid junctions may also be employed.

The diodes 32 and 33 are located in the two arms of one pair of conjugate arms of the hybrid junction 31. When no bias is applied to the diodes 32 and 33, microwave energy from the oscillator 21 is reflected equally and in phase from the two crystals, and no microwave energy is coupled to wave guide 11. However, when pulses from the word generator 24 are applied to crystal 33, its impedance state is changed with respect to that of diode 32, and a pulse of microwave energy appears on wave guide 11. Accordingly, the train of microwave pulses 27 corresponds to the direct current pulses at the output of the word generator 24. Similarly, microwave control pulses are applied to wave guides 14 and 15. However, because the control pulses on wave guides 14 and 15 are normally employed to switch complete "words" of information on the signal input wave guide 11, the control pulses on wave guides 14 and 15 normally occur just before digit period 1, and immediately after digit period 8 of the wave form 27.

The microwave pulses in wave guides 11, 14, and 15 are amplified by the amplifiers 36, 37, and 38 which may, for example, be traveling wave tubes. Traveling wave tubes and similar broad-band amplifiers which employ the drift time of electrons to obtain amplification may be employed to amplify the microwave pulses.

The lock-up circuit per se includes the microwave oscillator 41 and the hybrid junctions 42 and 43. The diodes 44 and 45 are located in two arms of the hybrid junction 42. The diodes 44 and 45 each have their own biasing circuits, including the voltage source 46 and the resistor 47 connected in series with diode 44, and the voltage source 48 and resistor 49 connected in series with diode 45. The two diodes are biased unequally however, so that microwave energy from the oscillator 41 is normally coupled to wave guide 51 and to the hybrid junction 43. The two crystals 52 and 53 in the control arms of hybrid junction 43 are normally equally biased so that no energy is coupled to wave guide 55. The detection diode 56 is therefore not energized, and no control signal is developed on lead 57.

The crystals 61 and 62 associated with hybrid junction 13 are normally biased to present the same impedance. Therefore, in the absence of control signals from leads 57 and 66, no signal energy is coupled from the input wave guide 11 to the signal output wave guide 12.

When a microwave "set" pulse is applied to wave guide 14, however, the detection diode 64 is energized, and a negative pulse is applied to control diode 53. This increases the negative bias on diode 53, and changes its impedance state with respect to diode 52. When diodes 52 and 53 have different impedance states, energy is coupled to the wave guide stub 55 and energizes diode 56. The energization of diode 56 produces a positive direct current signal on the control lead 57. This has the effect of biasing diode 52 in the low resistance sense. The impedance state of diode 52 is now significantly different from the normal state of the two diodes 52 and 53, so that even after the termination of the set pulse applied to wave guide 14, the diode 56 will remain energized. A positive control pulse on lead 57 is also coupled to diode 61 by the lead 66. The diode 61 is switched to its low resistance state to unbalance the hybrid junction 13. Accordingly, signals are transmitted from the input wave guide 11 to the signal output wave guide 12.

When signals are to be blocked at the hybrid junction 13, a microwave release pulse is applied to wave guide 15. The diode 67 produces a positive pulse on control lead 68, and this is coupled to the diode 44 by condenser 69. The diode 44 is driven positively, so that it presents the same impedance as diode 45. When the two conjugate arms of the hybrid 42 which include the crystals are balanced, no signals are transmitted to wave guide 51. The microwave signals which have been transmitted through hybrid 43 to energize diode 56 are interrupted. Diodes 52 and 53 are then restored to their normal balanced condition. Following the termination of the release pulse on wave guide 15, microwave signals are again applied to hybrid 43 on wave guide 51. However, with diodes 52 and 53 in the balanced condition, the microwave signals are blocked from diode 56.

At the time the diode 56 is de-energized, control signals on leads 57 and 66 are terminated, and the hybrid 13 is restored to its blocking state. No signals are transmitted from input wave guide 11 to the signal output wave guide 12 unitl the arrival of the next subsequent set pulse on wave guide 14.

Figure 2:
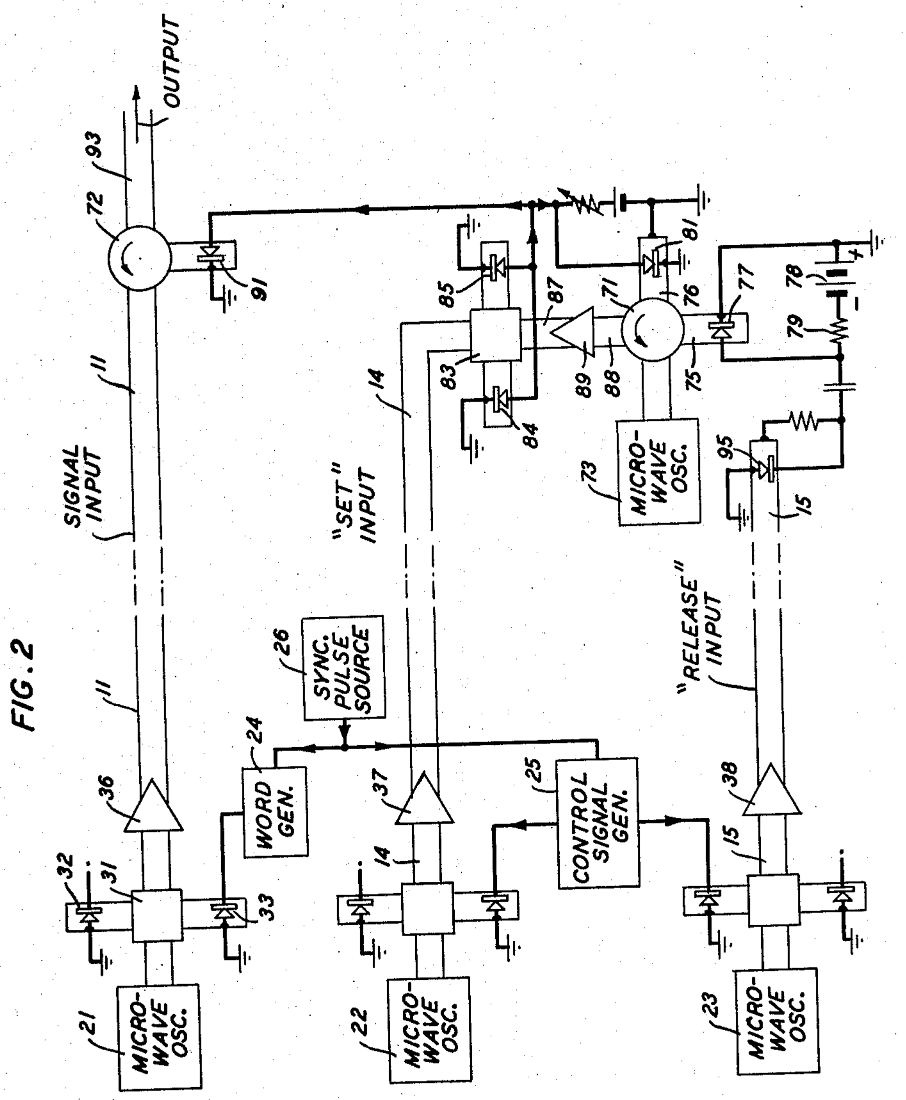
Fig. 2 is a lock-up circuit in which both circulators and hybrid junctions are employed as the switching elements, in accordance with another specific embodiment of this invention.

The circuit of Fig. 2 performs much of the same function as the circuit of Fig. 1. However, in Fig. 2 switching components of the type known as "circulators" are employed, instead of hybrid junctions. The pulse generation circuitry associated with Fig. 2 is much the same as that associated with Fig. 1. Accordingly, the circuit components up to and including the input wave guides 11, 14, and 15 bear the same numbers as the corresponding circuit components of Fig. 1.

The switching circuit of Fig. 2 includes two circulators 71 and 72. A circulator is a nonreciprocal device which couples electrical signals to successive output terminals. Thus, for example, microwave energy applied to circulator 71 from the microwave oscillator 73 is coupled to the wave guide stub 75. Microwave energy which may be reflected back from wave guide 75 toward circulator 71 is coupled to the wave guide stub 76. This is, of course, contrary to the normal reciprocal mode of operation expected of passive wave guide components. The nonreciprocal properties of circulators are normally obtained by the use of magnetized non-conducting material such as the bimetallic ferrites. One typical circulator structure is disclosed in the application of W. M. Goodall cited above.

Considering the mode of operation of the circuits associated with circulator 71 in detail, the diode 77 is normally biased in the high resistance direction by the voltage source 78 and resistor 79. When the diode 77 is in the high resistance state, it does not block the transmission of microwaves to any appreciable extent. Microwave energy from the oscillator 73 is therefore reflected from the end of the wave guide stub 75 and is coupled to wave guide 76. The diode 81 in the wave guide stub 76 is normally in the low resistance state to absorb microwave energy applied to wave guide 76. However, when a set pulse is applied on wave guide 14 to the hybrid junction 83, the detection diodes 84 and 85 supply a negative pulse to diode 81. The negative pulse biases diode 81 to the high resistance direction, and microwave signals are coupled to output wave guide 87.

Signals on output wave guide 87 are amplified by the traveling wave tube amplifier 89 and applied to the hybrid junction 83. The signals from wave guide 87 continue to energize the crystal detectors 84 and 85 so that a negative control voltage is still applied to diode 81 after the set pulse has terminated.

Control signals from the detectors 84 and 85 are also applied to diode 91 associated with the circulator 72. The diode 91 is normally in the low resistance state to absorb signals applied to circulator 72 on the input wave guide 11. However, when negative pulses are applied to it from the crystal detectors 84 and 85, it is biased in the high resistance state and energy is coupled to the signal output wave guide 93.

Microwave release pulses on wave guide 15 control diode 77 by positive direct current pulses from the detector diode 95. The positive direct current pulses bias diode 77 in the low resistance direction so that microwave energy from the oscillator 73 is absorbed in the wave guide stub 75. This interruption of the microwave signals causes the de-energization of diodes 84 and 85, and results in the restoration of diodes 81 and 91 to the low resistance or absorbing states. Under these circumstances, signals on wave guide 11 are blocked from wave guide 93. The arrival of the next subsequent set pulse on wave guide 14, however, restores the connection between wave guides 11 and 93.

Figure 3:
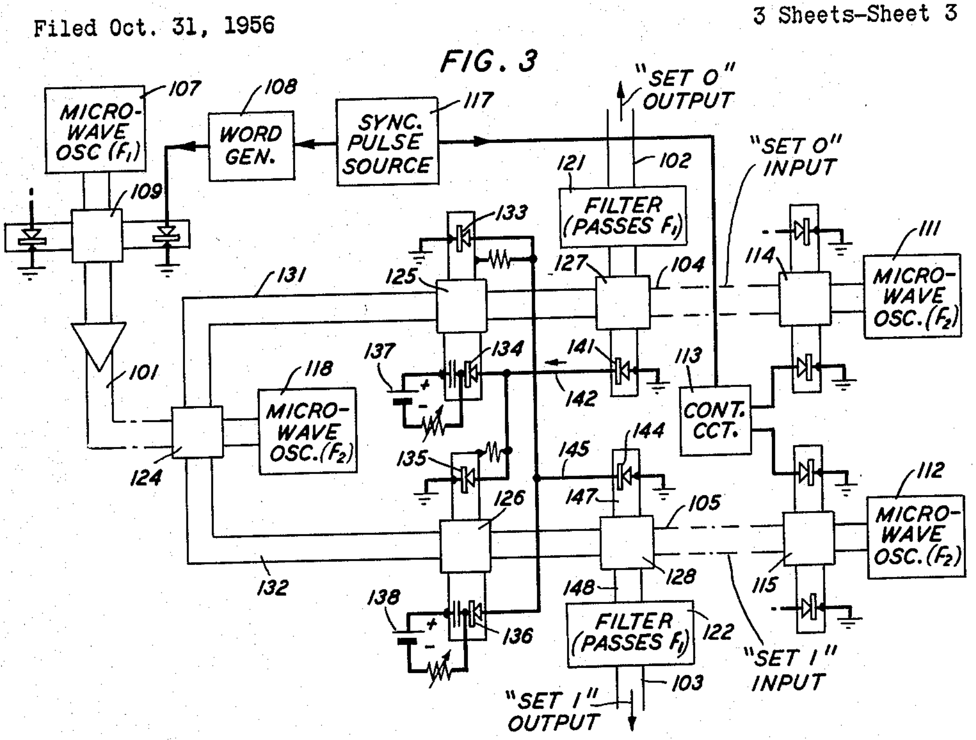
Fig. 3 is another embodiment of the invention in which microwave input signals are routed to either of two output circuits in accordance with the state of a microwave multivibrator circuit.

Fig. 3 shows a microwave equivalent of a single-pole, double-throw switch in accord with a preferred form of the invention. Thus, for example, signals on input wave guide 101 may be coupled either to output wave guide 102 or output wave guide 103, in accordance with the state of the control circuitry. When a control pulse has been received on the "set 0" input wave guide 104, for example, input signals on wave guide 101 are coupled to wave guide 102. Following the receipt of a "set 1" microwave pulse on wave guide 105, however, input signals on wave guide 101 are routed to output wave guide 103.

The pulse generation circuitry for Fig. 3 is much like that required for Figs. 1 and 2. Signals from the microwave oscillator 107 are modulated by pulses from the word generator 108 in the hybrid junction 109. The microwave oscillators 111 and 112 are modulated by signals from the control circuit 113 in hybrid junctions 114 and 115 to provide the "set 0" and "set 1" microwave pulses, respectively. The synchronizing pulse source 117 is employed to control the timing of pulses from the word generator 108 and the control circuit 113. An additional source of microwave signals 118 is also provided to supply microwave energy for lock-up signal purposes. In view of the presence of both control signals and signal information pulses in the wave guide circuitry of Fig. 3, the microwave oscillator 107 has a different frequency ($f_1$) than the frequency ($f_2$) of the microwave oscillators 111, 112, and 118. In addition, the filters 121 and 122 are provided at the output circuits to discriminate against signals having a frequency ($f_2$), and to pass the signal information pulses which have a frequency ($f_1$).

Considering the mode of operation of the switching circuit itself in some detail, it will initially be assumed that no input signals are being received on wave guides 101, 104, and 105, and that the circuit is in the "set 0" state. The switching circuit includes five hybrid junctions 124, 125, 126, 127, and 128. Microwave signals from the oscillator 118 are coupled to wave guides 131 and 132 by the hybrid junction 124. Depending on the state of the switching circuit, microwave signals from oscillator 118 are blocked by hybrid 125 and passed by hybrid junction 126, or vice versa.

The diodes 133 and 134 in the two control wave guide arms associated with hybrid 125 are normally unbalanced. Similarly, the two diodes 135 and 136 associated with hybrid 126 are normally unbalanced. The voltage source 137 is connected to bias diode 134 in the conducting state and to bias diode 135 in the reverse current direction in the absence of additional control signals. In a like manner, voltage source 138 biases diode 136 in the low resistance state, and diode 133 in the reverse current sense.

When a "set 0" microwave pulse is applied to hybrid junction 127, the detection diode 141 applies a positive direct current pulse to control lead 142. The application of a positive control pulse to diode 135 changes its impedance to the low resistance state. Diode 135 then presents the same impedance to microwave signals as diode 136. The hybrid junction 126 therefore blocks signals from the wave guide 132.

The positive pulse on lead 142 has little effect on diode 134, as it is already biased in the low resistance direction. With diode 133 biased in the high resistance sense, the hybrid 125 is unbalanced, and signals from the microwave oscillator 118 on wave guide 131 are transmitted to hybrid 127. After the "set 0" pulse terminates, microwave energy from oscillator 118 is still applied to detection diode 141 to maintain the positive bias on control lead 142.

When a "set 1" pulse is received on wave guide 105, however, the detection diode 144 is energized, and applies a positive direct current pulse on control lead 145. The energization of control lead 145 with a positive direct current signal biases the diode 133 associated with hybrid 125 in the low resistance direction. When diodes 133 and 134 are both in the low resistance state, the hybrid junction 125 is balanced, and no microwave signals are transmitted through it to hybrid junction 127. With no microwave signals being picked up by detection diode 141 associated with hybrid junction 127, the control diode 135 resumes its normal impedance state in which it is biased in the reverse current direction. The positive voltage on lead 145 reinforces the action of voltage source 138 in biasing diode 136 in the low resistance direction. Now, with control diodes 135 and 136 in opposite impedance states, the hybrid junction 126 is unbalanced, and microwave signals on wave guide 132 are transmitted to hybrid junction 128. Microwave signals are then applied to the detection diode 144 so that positive control signals are still applied to control lead 145 even after the termination of the "set 1" microwave pulse on wave guide 105.

When the switching circuit of Fig. 3 is in the "set 1" state, microwave signals from the oscillator 118 are applied to hybrid junction 128. Similarly, input pulse signals on wave guide 101 are applied to hybrid junction 124 and are coupled through hybrid junctions 124 and 126 to hybrid junction 128. All the microwave energy applied to hybrid junction 128 is coupled both to the wave guide stub 147 and to wave guide 148. However, with microwave oscillator 107 operating at one frequency ($f_1$) and microwave oscillator 118 operating at a second frequency ($f_2$), the filter 122 may be adjusted to pass only the desired output signals at the first frequency ($f_1$) and reject microwave signals having the second frequency ($f_2$) which originate from the oscillator 118. Similarly, microwave signals from the input wave guide 101 are coupled to output wave guide 102 during the interval following the "set 0" control signal. The filter 121 performs the same function as filter 122 in blocking the undesired control signals from oscillator 118.

Figure 4:
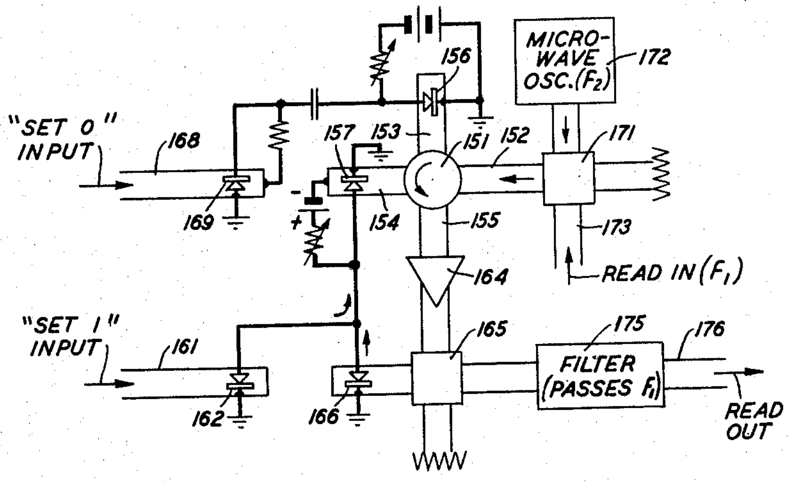
Fig. 4 is another switching circuit in accordance with this invention which circuit may be set to either of two distinct states.

The circuit of Fig. 4 is another microwave switching circuit which can be set to either of two distinct states. The circuit of Fig. 4 is patterned closely after that of Fig. 2, and operates in much the same manner.

The central switching component of the circuit of Fig. 4 is the circulator 151. The circulator 151 has an input wave guide 152, two control wave guide stubs 153 and 154, and an output wave guide 155. Signals applied to the circulator 151 on the input wave guide 152 are coupled to the output wave guide 155 if each of the control diodes 156 and 157 in the wave guide stubs 153 and 154, respectively, is in the high resistance state.

Under normal conditions, diode 156 is in the high resistance state, while diode 157 is biased to the proper low resistance state for absorbing microwave signals. Under these circumstances, microwave energy applied to the circulator 151 from wave guide 152 is reflected from the end of wave guide stub 153 and is absorbed in the wave guide stub 154. When a "set 1" microwave input pulse is applied to wave guide 161, a negative pulse is developed by the detection diode 162. This negative pulse biases the diode 157 to the high resistance state, and energy is reflected back to the circulator 151 and is coupled to wave guide 155. After transmission through the traveling wave tube amplifier 164, the output microwave energy is applied to hybrid junction 165. The detection diode 166 associated with hybrid junction 165 also supplies a negative control voltage to diode 157. Accordingly, even after the termination of a "set 1" signal on wave guide 161, the control diode 157 remains in the high resistance state.

As in the lock-up circuit of Fig. 2, the control diode 156 in the first wave guide stub 153 is normally biased in the high resistance state. When a "set 0" input signal is applied on wave guide 168, however, the detector diode 169 applies a positive pulse to the control diode 156, and changes its impedance state. In its new low resistance impedance state, control diode 156 absorbs microwave signals applied to wave guide stub 153, and blocks signals from diode 166. With diode 166 de-energized, the diode 157 resumes its normal low resistance state. Under these conditions, microwave energy is absorbed in wave guide stub 154 and does not reach wave guide 155 even after the termination of a "set 0" microwave pulse on wave guide 168.

The input circuitry to the wave guide 152 may include the hybrid junction 171 to which is coupled a microwave oscillator 172. A wave guide 173 is connected to another input terminal of the hybrid junction 171. The signals applied on wave guide 173 are at a first microwave frequency ($f_1$), and the microwave oscillator 172 operates at a second frequency ($f_2$). At the output from hybrid junction 165, a filter 175 is provided to block microwave signals of the second frequency ($f_2$) originally at oscillator 172, and to pass microwave signals of the first frequency ($f_1$) from wave guide 173.

The switching circuit of Fig. 4 is essentially a circuit for storing binary information. When the circuit is in the "set 1" state, the application of a pulse on lead 173 results in an output pulse on wave guide 176. When the circuit is in the "set 0" state, however, the switching circuit blocks pulses applied to lead 173 and no signals appear at output wave guide 176.

It is to be understood that the above-described arrangements are illustrative of the application of the principles of the invention. Numerous other arrangements may be devised by those skilled in the art without departing from the spirit and scope of the invention.

What is claimed is:

1. In a microwave logic system, a microwave switching circuit having at least three arms, detector means in one of said arms, diode means in a second of said arms, a source of microwave signals connected to a third of said arms, said switching circuit normally preventing application of said microwave signals through said switching circuit to said detector means, means for enabling said microwave signals to be applied to said detector means, means connecting said detector means to said diode means for causing said diode means to continue to enable the application of said microwave signals to said detector means, and means for disabling the application of said signals to said detector means to cause said switching circuit to return to its normal state.

2. In a microwave logic system, a microwave switching component having at least three arms, control means including at least one control diode in one of said arms, detector means in another of said arms, means for applying microwave signals to a third of said arms, means connected to said control means for enabling said microwave signals to be applied to said detector means, means connecting said detector means to said control means to cause said control means to continue to enable the application of said microwave signals to said detector means, and means for interrupting the application of said microwave signals to said detector means.

3. In combination, a wave guide switching circuit, an oscillator connected to apply microwave energy to an input of said switching circuit, means including a diode connected in one arm of said switching circuit for switching the microwave output from said switching circuit to a second arm of said switching circuit, a microwave detector connected to said second arm of said switching circuit, additional means for periodically applying microwave signals to said detector, means connecting said detector to said diode for changing the impedance of said diode and switching said microwave energy to said second arm, and resetting means for interrupting the transmission of microwave energy from said oscillator to said detector.

4. In combination, a wave guide switching circuit, an oscillator connected to apply microwave energy to an input of said switching circuit, means including a diode connected in one arm of said switching circuit for coupling the microwave output from said switching circuit to a second arm of said switching circuit, a microwave detector connected to said second arm of said switching circuit, additional means for periodically applying microwave signals to said detector, means connecting said detector to said diode to change the impedance of said diode and thereby to switch said microwave energy to said second arm, resetting means for interrupting the transmission of microwave energy from said oscillator to said detector, an additional wave guide switching circuit including another diode, and means for applying a signal from said detector to said last-mentioned diode to control the switching action of said additional wave guide switching circuit.

5. In combination, a wave guide switching circuit, an oscillator connected to apply microwave energy to an input of said wave guide circuit, means including a diode connected in one arm of said wave guide circuit for switching the microwave output from said wave guide circuit to a second arm of said wave guide circuit, a microwave detector connected to said second arm of said wave guide circuit, means connecting said detector to said diode for changing the impedance of said diode and thereby switching said microwave energy to said second arm, an additional source of microwave signals, means for coupling direct current control signals derived from said microwave signals to said diode, and resetting means for interrupting the transmission of microwave energy from said oscillator to said detector.

6. In combination, a circulator, means for applying microwave energy to one arm of said circulator, a first control diode in a second arm of said circulator, means for applying control signals to said first diode for switching said diode between one impedance state in which signals are absorbed by said second arm of said circulator and another impedance state in which signals are reflected back to said circulator, a second control diode in a third arm of said circulator, and means for switching said second diode between a first impedance state in which signals are absorbed by said third arm and another impedance state in which signals are reflected in said circulator.

7. In combination, a circulator, means for applying microwave energy to one arm of said circulator, a first control diode in a second arm of said circulator, means for applying control signals to said first diode for switching said diode between one impedance state in which signals are absorbed by said second arm of said circulator and another impedance state in which signals are reflected back to said circulator, a second control diode in a third arm of said circulator, means for switching said second diode between a first impedance state in which signals are absorbed by said third arm and another impedance state in which signals are reflected to said circulator, and additional means responsive to wave guide energy reflected back to said circulator from said third arm of said circulator for applying signals to one of said control diodes.

8. In combination, a first wave guide, means for applying binary signals in microwave pulse form to said first wave guide, second and third wave guides, means for applying control signals in microwave pulse form to said second and third wave guides, a microwave switching component connected to said first wave guide, means including a control diode for changing the state of said switching component, means responsive to the application of a microwave pulse to said second wave guide for applying control signals to change the state of said control diode, means for maintaining said control signals following the termination of the control pulse on said second wave guide, and means for interrupting said direct current control signals in response to the application of a microwave pulse on said third wave guide.

9. In combination, a wave guide switching circuit, an oscillator connected to apply microwave energy to an input of said switching circuit, means including a diode connected in one arm of said wave guide switching circuit for switching the microwave output from said switching circuit from said first arm to a second arm of said switching circuit, a microwave detector connected to said second arm of said switching circuit, additional means for periodically applying microwave signals to said detector, means connecting said detector to said diode for applying control signals to said diode and switching said microwave energy to said second arm, and resetting means for stopping the application of said control signals to said diode.

10. In combination, a wave guide switching circuit, an oscillator connected to apply microwave energy to an input of said switching circuit, means including a variable impedance element coupled to one arm of said switching circuit for switching the microwave output from said switching circuit from said first arm to a second arm of said switching circuit, a microwave detector connected to said second arm of said wave guide switching circuit, additional means for periodically applying microwave signals to said detector, means connecting said detector to said variable impedance element for applying control signals to said element and switching said microwave energy to said second arm, and resetting means for stopping the application of said control signals to said variable impedance element.

11. In combination, a wave guide switching circuit, an oscillator connected to apply microwave energy to an input of said switching circuit, means including a diode connected in one arm of said switching circuit for selectively coupling the microwave output from said switching circuit to a second arm of said switching circuit, a microwave detector connected to said second arm of said wave guide switching circuit, additional means for periodically applying microwave signals to said detector, means connecting said detector to said diode for applying direct current control signals to said diode and for coupling said microwave energy to said second arm, and resetting means for interrupting said direct current control signals.

12. In combination, a first wave guide, means for applying binary signals in microwave pulse form to said first wave guide, second and third wave guides, means for applying control signals in microwave pulse form to said second and third wave guides, a microwave circulator connected to said first wave guide, means including a control diode for changing the switching state of said circulator, means responsive to the application of a microwave pulse to said second wave guide for applying control signals to change the impedance state of said control diode, means for maintaining said control signals following the termination of the control pulse on said second wave guide, and means for interrupting said control signals in response to the application of a microwave pulse on said third wave guide.

13. In combination, a first wave guide, means for applying binary signals in microwave pulse form to said first wave guide, second and third wave guides, means for applying control signals in microwave pulse form to said second and third wave guides, first and second microwave switching components connected to receive microwave energy from said first wave guide, means including control diodes coupled to said first and second switching components for changing the states of said first and second switching components, means responsive to the application of a microwave pulse to said second wave guide for applying direct current control signals to change the impedance states of said control diodes, means for maintaining said direct current control signals following the termination of the control pulse on said second wave guide, and means for interrupting said direct current control signals in response to the application of a microwave pulse on said third wave guide.

14. In a microwave logic system, a microwave switching component having at least three arms, diode means connected to one of said arms, detector means connected to another of said arms, a source of microwave signals connected to a third of said arms, said component normally preventing application of said signals to said detector means, means for causing said signals to be applied to said detector means, means connected between said detector means and said diode means for transmitting detected signals from said detector means to said diode means to cause said component to continue to pass said signals to said detector means, and means for disabling the passage of said detected signals to said diode means to cause said component to return to its normal state.

15. In a microwave logic system, a first wave guide, a source of microwave pulses connected to said first wave guide, a microwave switching component connected to said first wave guide, an output wave guide connected to said component, diode means connected to said component for determining the transmission of said pulses through said component from said wave guide to said output wave guide, a microwave oscillator, a detector, means for applying signals from said oscillator to said detector, means for applying a signal from said detector to said diode means to determine the impedance state of said diode means, first control means including first pulse means for enabling the application of said oscillator signals to said detector, second control means including second pulse means for preventing the application of said oscillator signals to said detector, and means responsive to said first control means for maintaining the application of said oscillator signals to said detector, said last-mentioned means being disabled by said second control means.

16. In combination, a microwave switching circuit, a plurality of wave guides coupled to said switching circuit, means including a diode located in one of said wave guides for changing the state of the switching circuit, first and second control means each including diode means for changing the impedance state of said first-mentioned diode, means responsive to the energization of said first control means for enabling said second control means, and means for disabling said second control means.

17. In combination, a microwave switching circuit, a plurality of wave guides coupled to said microwave swtiching circuit, means including a diode located in one of said wave guides for changing the state of the switching circuit, means for applying binary signals in microwave pulse form through one of said wave guides to said microwave switching circuit, first and second control means each including diode means for changing the impedance state of said first-mentioned diode, means responsive to the energization of said first control means for enabling said second control means, and means for disabling said second control means.

References Cited in the file of this patent

UNITED STATES PATENTS

| | | |
|---|---|---|
| 2,475,474 | Bruck et al. | July 5, 1949 |
| 2,617,885 | Cutler | Nov. 11, 1952 |
| 2,688,695 | Odell | Sept. 7, 1954 |
| 2,735,933 | Pierce | Feb. 21, 1956 |